May 28, 1957

M. V. MARSHALL 2,793,900

NOISELESS MOTOR VEHICLE BUMPER COVER

Filed Aug. 27, 1951

INVENTOR.
Mary V. Marshall,

BY Victor J. Evans & Co.

ATTORNEYS

May 28, 1957 M. V. MARSHALL 2,793,900
NOISELESS MOTOR VEHICLE BUMPER COVER
Filed Aug. 27, 1951 2 Sheets-Sheet 2

INVENTOR.
Mary V. Marshall,
BY Victor J. Evans & Co.
ATTORNEYS

United States Patent Office 2,793,900
Patented May 28, 1957

---

2,793,900

NOISELESS MOTOR VEHICLE BUMPER COVER

Mary V. Marshall, Jackson Heights, N. Y.

Application August 27, 1951, Serial No. 243,868

1 Claim. (Cl. 293—71)

This invention relates to attachments for bumpers of motor vehicles, and in particular a sheet of rubber or other resilient material shaped to conform to the bumper of a motor vehicle or to a part thereof such as a guide, and having a coil spring extended continuously through a hem in the edge for drawing the edges of the sheet of material over the edges of the bumper, or the like.

The purpose of this invention is to provide a resilient cover for bumpers of motor vehicles whereby the noise resulting from metal to metal contact when a bumper of one vehicle strikes a bumper or other part of the other is substantially eliminated.

In the conventional type of motor vehicle bumper, and particularly in parking a vehicle between parked vehicles objectional noise results each time the bumpers engage and with a resilient cover sheet positioned over the bumpers this noise will be substantially eliminated. Furthermore, numerous dents are placed in fenders in parking and also in small accidents where the bumper of one vehicle comes in contact with the fender or other part of another and with a comparatively heavy resilient pad covering the bumpers of vehicles such dents will be substantially eliminated.

With these thoughts in mind this invention contemplates a cover of rubber or other resilient material positioned over the bumpers or guards or over bars resiliently mounted on the bumpers of motor vehicles whereby a yielding action results from the contact of the bumper with another bumper or other part of a vehicle.

The object of this invention is, therefore, to provide means for providing resilient covers for bumpers or parts thereof, of motor vehicles wherein direct metal to metal contact is avoided when one vehicle engages another.

Another object of the invention is to provide a resilient cover for bumpers of motor vehicles that may be installed over bumpers now in use without changing the bumpers or attaching means therefor.

A further object of the invention is to provide means for attaching sheets of resilient material to bumpers or corresponding parts of motor vehicles wherein the resilient units are of a simple and economical construction.

With these and other objects and advantages in view the invention embodies in the preferred form a bar spaced from and positioned to cover the conventional bumper of a motor vehicle, means resiliently holding the bar from the bumper and a sheet of resilient material having a continuous wire coil in the edge thereof positioned over the bar and secured in position by the said wire coil.

Other features and advantages of the invention will appear from the following description taken in connection with the drawings, wherein.

Figure 1:
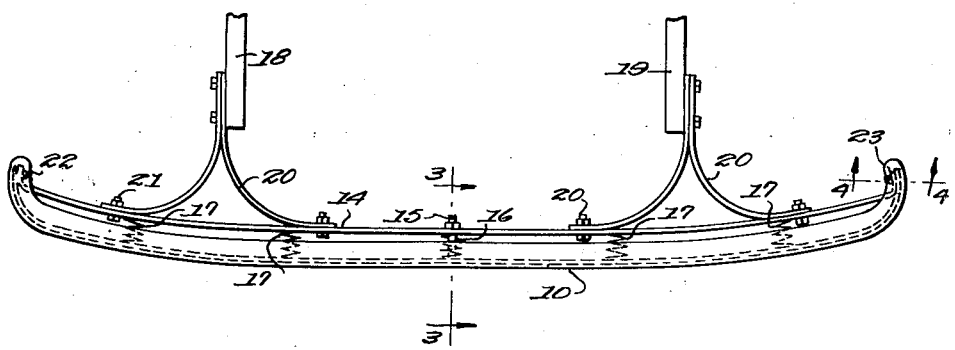
Figure 1 is a plan view of a bumper showing the resilient covering positioned thereon.
Figure 2:
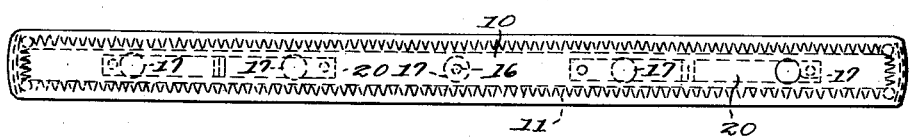
Figure 2 is a front elevational view of the bumper shown in Figure 1.

Referring now to the drawings wherein like reference characters denote corresponding parts the improved resilient cover of this invention, as illustrated in Figures 1 to 4 inclusive of the drawings, includes a sheet 10 which is formed of rubber or other resilient material, a coil spring 11 extended through a hem 12 extended continuously around the edges of the sheet 10, and an auxiliary bar 13 which is mounted on the conventional bumper 14 with bolts 15 and which is resiliently held in spaced relation to the bumper by springs 16 and 17.

In this design the bar 14, similar to the conventional bumper of a motor vehicle is suspended from side beams 18 and 19 of the chassis of a vehicle by a strap 20, the outer ends of which are attached to bar 14 by bolts 21.

The bar 14 is provided with extended ends 22 and 23 and the ends of the bar 13 are secured to the ends 22 and 23 by bolts or studs 24 which extend from the bar 13 and which are provided with nuts 25.

The bars 13 and 14 are connected at the center by the bolts or studs 15 and the position of the bar 13 in relation to the bar 14 is adjusted by a nut 26. The spring 17 may be secured to the bars by welding or other suitable means.

Figure 3:
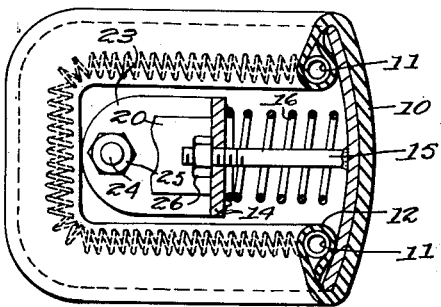
Figure 3 is a cross section through the bumper taken on line 3—3 of Figure 1 and with the parts shown on an enlarged scale.
Figure 4:
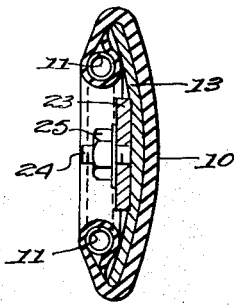
Figure 4 is a similar section taken on line 4—4 of Figure 1 and also with the parts shown on an enlarged scale.

With the bumper formed in this manner the resilient sheet 10 is snapped over the edges of the bar 13 with the coil spring 11 contracted the edges extended over the edges of the bar, as illustrated in Figure 3, whereby the resilient sheet is positively held in position.

Figure 6:
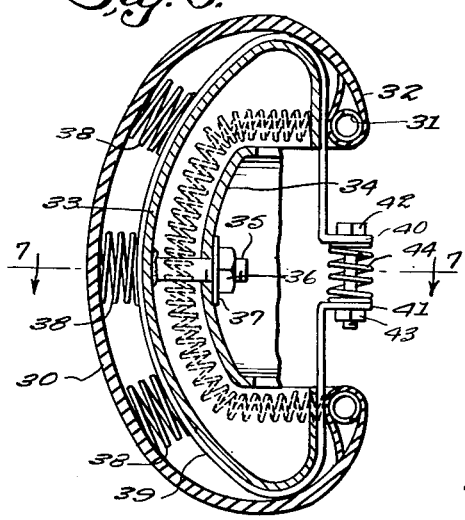
Figure 6 is a cross section taken through a guard of a bumper of a motor vehicle, illustrating a modification wherein the guard is covered with a sheet of resilient material and the sheet of resilient material is retained in spaced relation from the guard with coil springs.
Figure 7:
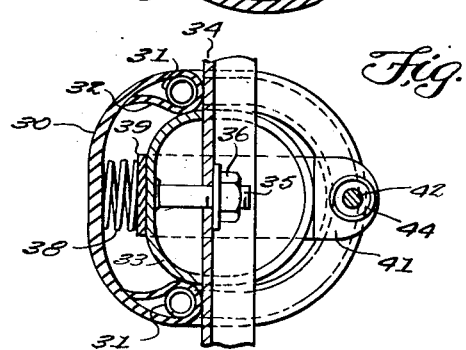
Figure 7 is a sectional plan through the guard taken on line 7—7 of Figure 6.

In the design illustrated in Figures 6 and 7 a sheet 30 rubber or other resilient material and having a continuous coil spring 31 in a hem 32 extended continuously around the edge thereof is snapped over a guard 33 which is mounted on a bumper 34 by a stud 35 with a nut 36 and a washer 37 thereon.

It will be understood that the guard may be mounted on the bumper by other suitable means.

The resilient cover 30 is spaced from the guard 33 by coil springs 38 which are secured, preferably by welding to a strap 39 which is extended over the guard, as shown in Figure 6. The ends of the strap are provided with flanges 40 and 41 and a bolt 42 with a nut 43 on one end extends through the flanges. A spring 44 is positioned around the bolts and between the flanges for resiliently urging the flanges apart.

It will be understood that the covering sheet 30, in the design illustrated in Figures 6 and 7, may be provided in different shapes and designs to accommodate different types of motor vehicle guards.

Figure 5:
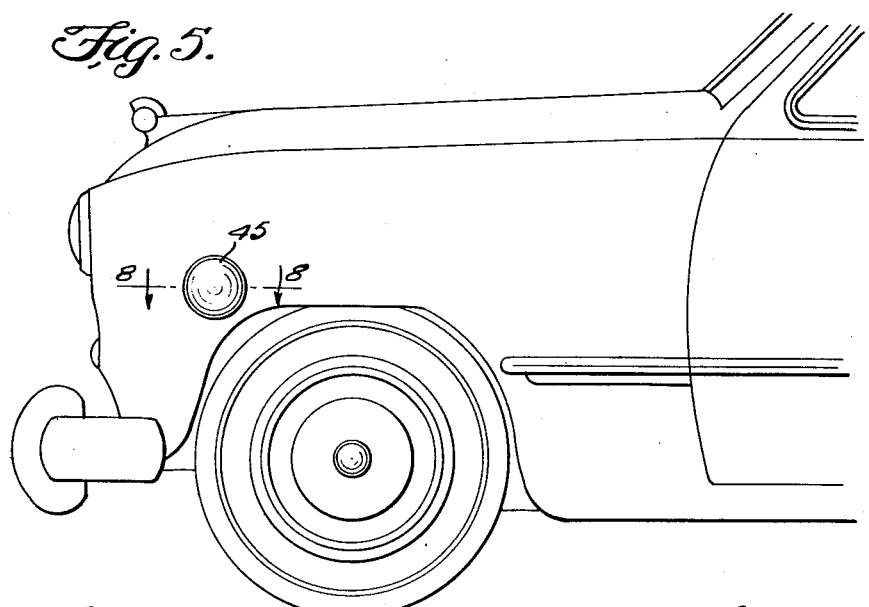
Figure 5 is a front elevational view showing the forward end of a motor vehicle with a bumper positioned on the front fender of the vehicle and with the guard of the front bumper of the vehicle covered with resilient material.
Figure 8:
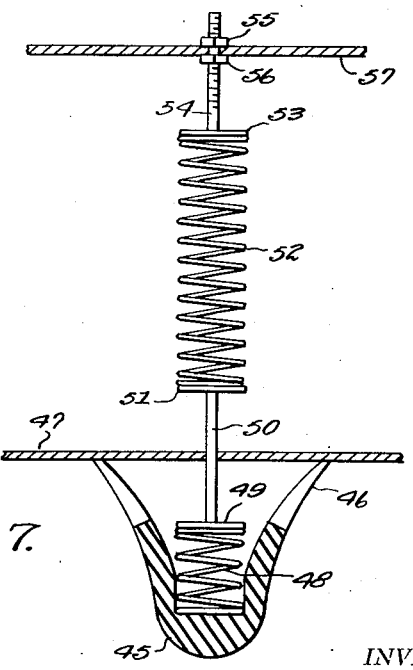
Figure 8 is a sectional plan taken on line 8—8 of Figure 5 illustrating the resilient fender bumper.

The fender bumper illustrated in Figures 5 and 8 is provided with a cup shaped member 45 that may be formed of rubber or other suitable resilient material, and this member is provided with an arcuate outer end or nose and a peripheral serrated flange 46 that rests against the outer surface of the outer wall 47 of a fender.

The member 45 is secured on the outer end of a spring 48, the inner end of which is attached to a disc 49 on a rod 50, which extends through the fender wall 47, and a disc 51 of the inner end of the rod 50 is attached to a spring 52, the opposite end of which is attached to a disc 53 on a threaded stud 54 which is adjustably held by nuts 55 and 56 in the inner wall 57 of the fender.

With the resilient cup shaped member 45 mounted on the other surface of a fender in this manner all danger of fenders being dented by engagement thereof with rigid objects is substantially eliminated. It will be appreciated that the bumper 45 may be positioned at a point of the fender that extends outwardly the greatest distance from the vehicle and as many of the bumpers, as may be desired, may be used on the fenders of a vehicle.

With the parts arranged in this manner the resilient bumper covers may be provided as separate and independent units and may be snapped over the bumpers of a motor vehicle or may be installed with separate bars spaced from and resiliently mounted on the bumper or other part of a vehicle.

It will be understood that modifications may be made in the design and arrangement of the parts without departing from the spirit of the invention.

What is claimed is:

In a motor vehicle bumper cover, the combination which comprises an elongated bar having arcuate ends adapted to be positioned on a motor vehicle to provide a bumper, an auxiliary bar spaced from said bumper and also having arcuate ends, bolts securing the ends of the auxiliary bar to the arcuate ends of the bumper, bolts mounted in the auxiliary bar and extended through openings in the bumper, certain of said bolts being arranged contiguous to the ends of said bumper and said auxiliary bar, springs around the bolts and positioned between the auxiliary bar and bumper, an elongated sheet of material of non-circular shape having a hem on the edge, said hem being continuous and an endless wire coil spring positioned in the hem of the sheet of material for contracting the edge of said sheet of material over the auxiliary bar and ends of the bumper; said sheet of material extending around the ends of the bumper and covering the outer ends of the bumper and bar.

References Cited in the file of this patent

UNITED STATES PATENTS

| | | |
|---|---|---|
| 981,260 | Harris | Jan. 10, 1911 |
| 1,182,994 | Draver | May 16, 1916 |
| 1,335,165 | Hick | Mar. 30, 1920 |
| 1,672,335 | O'Meara | June 5, 1928 |
| 1,673,692 | Marston | June 12, 1928 |
| 1,681,677 | Masselman | Aug. 21, 1928 |
| 1,682,858 | Sipe | Sept. 4, 1928 |
| 1,686,991 | Schauman et al. | Oct. 9, 1928 |
| 1,796,628 | Seward | Mar. 17, 1931 |
| 1,833,367 | Moore | Nov. 24, 1931 |
| 1,858,569 | Woodworth | May 17, 1932 |
| 2,153,896 | Mohan | Apr. 11, 1939 |
| 2,239,422 | Hayashi | Apr. 22, 1941 |
| 2,531,967 | Bishop | Nov. 28, 1950 |